United States Patent [19]

Kuraoka et al.

[11] 4,118,984
[45] Oct. 10, 1978

[54] LIQUID LEVEL INDICATOR FOR AN EXTREMELY LOW TEMPERATURE-LIQUEFIED GAS EMPLOYING A SUPERCONDUCTOR WIRE

[75] Inventors: Yasuo Kuraoka; Astushi Kurosawa; Tetsuo Shirai; Katsuro Saito, all of Sapporo, Japan

[73] Assignee: Hoxan Co., Ltd., Sapporo, Japan

[21] Appl. No.: 828,678

[22] Filed: Aug. 29, 1977

[51] Int. Cl.² ............................................. G01F 23/24
[52] U.S. Cl. ..................................................... 73/295
[58] Field of Search ............................. 73/295, 304 R

[56] References Cited

U.S. PATENT DOCUMENTS

| | | | |
|---|---|---|---|
| 3,267,730 | 8/1966 | Satterthwaite et al. | 73/295 |
| 3,496,773 | 2/1970 | Cornish | 73/295 |
| 3,943,767 | 3/1976 | Efferson | 73/295 |

*Primary Examiner*—Donald O. Woodiel
*Attorney, Agent, or Firm*—George B. Oujevolk

[57] ABSTRACT

In a liquid level indicator for an extremely low temperature-liquefied gas wherein a current is caused to flow through a superconductor wire immersed in the extremely low temperature-liquefied gas, a voltage across terminals of the superconductor wire is measured, and the liquid level of the liquefied gas lying between the terminals is gauged on the basis of the measured value, the improvement therein comprising the providing of a current supply portion which, at first, increases the current to be fed to the superconductor wire up to the so-called plateau region in a current - voltage hysteresis curve of the superconductor wire, and thereafter, decreases it down to a return-path rectilinear region in the curve departing from the plateau region, the liquid level being gauged on the basis of the measured value of the terminal voltage of the superconductor wire as obtained by the use of the decreased current. The improved liquid level indicator is capable of measuring the liquid levels of, for example, helium over from the normal-pressure state to the superfluid state.

4 Claims, 3 Drawing Figures

LIQUID LEVEL INDICATOR FOR AN EXTREMELY LOW TEMPERATURE-LIQUEFIED GAS EMPLOYING A SUPERCONDUCTOR WIRE

BACKGROUND OF THE INVENTION

1. Field of the Invention

This invention relates to a liquid level indicator for liquefied gases at extremely low temperatures. More particularly, it relates to a liquid level indicator of the type which exploits the fact that when a superconductor wire is immersed in, e.g., liquid helium, its resistance varies in proportion as the liquid level of the helium rises or falls and in which the terminal voltage of the superconductor wire supplied with a current in advance is measured so as to gauge the liquid level.

2. Description of the Prior Art

Heretofore, liquid level indicators of the described type have been fabricated for laboratory use, and some have been commercialized. These liquid level indicators, however, are intended merely for liquid helium under the normal pressure (at 4.2 ° K). Accordingly, when the rate of evaporation of liquid helium has become high under a reduced-pressure state or when the surface of the liquid is in the superfluid state, the resistance of the superconductor wire, which is very greatly dependent upon the temperature, is subject to the influence thereof and a large dispersion arises in measured values. At the time of high pressures, the rate of evaporation of liquid helium becomes low, which is also a problem in degrading the reliability of measured values.

SUMMARY OF THE INVENTION

It is therefore an object of this invention to provide a liquid level indicator for liquefied gases at extremely low temperatures which is free from the undesirable variations of measured values attributed to the temperature-dependency of the superconductor wire as stated above and which can be satisfactorily put into practical use even in the reduced-pressure or superfluid state.

According to one aspect of performance of this invention, there is provided a liquid level indicator wherein a current is caused to flow through a superconductor wire immerged in an extremely low temperature-liquefied gas, a voltage across terminals of the superconductor wire is measured, and the liquid level of the extremely low temperature-liquefied gas lying between the terminals is gauged on the basis of the measured value. The invention concept is characterized by having a current supply portion which, at first, increases the current to be supplied to the superconductor wire up to a plateau region in a current — voltage hysteresis curve of said superconductor wire, and thereafter, decreases it down to a return-path rectilinear region in said curve departing from said plateau region, the liquid level being gauged on the basis of the measured value of the terminal voltage of said superconductor wire as obtained by the use of the decreased current.

The invention as well as other objects and advantages thereof will become more apparent from the following detailed description when taken together with the accompanying drawing, in which:

DETAILED DESCRIPTION OF THE INVENTION

Figure 1:
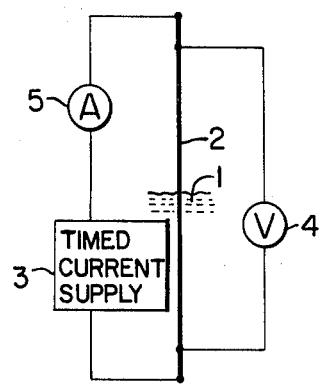
FIG. 1 is a circuit diagram of a liquid level indicator according to this invention.

As illustrated in FIG. 1, a superconductor wire 2 is immerged in a liquefied gas at extremely low temperatures 1, a current is caused to flow through the superconductor wire 2 from a current supply portion 3, and the terminal voltage of the superconductor wire 2 is measured by a voltmeter 4. This is the same as in the prior art. In the figure, numeral 5 designates an ammeter.

In this invention, however, the current supply portion 3 does not supply a mere constant current. As illustrated by way of example in FIG. 3, it is adapted to feed the superconductor wire 2 with a certain fixed current $I_1$ at first and with a current $I_2$ of a certain value smaller than $I_1$ after lapse of a predetermined time.

Figure 2:
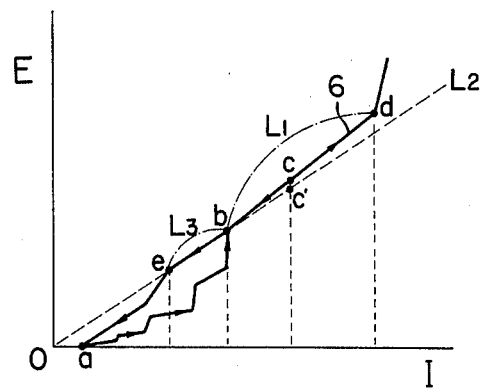
FIG. 2 is a graph showing the current — voltage hysteresis curve of a superconductor wire employed in the liquid level indicator in FIG. 1.

Here, the currents $I_1$ and $I_2$ will be described more in detail with reference to FIG. 2. This figure shows a current — voltage hysteresis curve 6 (in solid lines) for explaining the temperature-dependency of the superconductor wire 2. As a current is impressed on the superconductor wire 2, a voltage rises stepwise from point $a$ to point $b$. The hysteresis curve passes through points $b$, $c$ and $d$ along which is formed a rectilinear range $L_1$ being usually called the plateau region. Ordinarily, the prior-art liquid level indicators carry out the measurements by using the values of current between the points $b$ and $d$.

However, when the plateau region $L_1$ is carefully investigated, an error attributed to the temperature-dependency as indicated by points $c$ and $c'$ appears with respect to a proportional straight line $L_2$ drawn by a dotted line which couples the origin $o$ and the point $b$. Even in case where the measurement is conducted at the point $b$, it lacks in reliability because the plateau region changes due to a change of the height of, or any other change of, the liquid surface of the extremely low temperature-liquefied gas and a change of the rate of evaporation of the liquefied gas. Under the superfluid state, the plateau region $L_1$ shifts onto the lower current side, so that the error at the point $c$ ascribable to the temperature-dependency becomes still greater.

In this invention, therefore, the current is varied from the value $I_1$ to the value $I_2$ as stated previously. At first, the current $I_1$ is selected from within the range of the plateau region $L_1$ indicated by the points $b$, $c$ and $d$. Thereafter, the current is lowered to the value $I_2$. At this time, the current $I_2$ is so selected as to lie in a return-path rectilinear region $L_3$ (between points $b$ and $e$) of the curve 6 as departs from the point $b$.

Here will be explained a concrete example. The superconductor wire employed was an Nb-Ti wire having a diameter of 0.09 mm and a total length of 50 cm. The plateau region of the liquid level indicator in this example ranged from about 160 mA to about 320 mA for normal fluid helium, and from about 140 mA to about 280 mA for superfluid helium. It was observed that these values fluctuated in the order of ±10 mA due to changes in the rate of evaporation, the height of the liquid surface and the temperature of the helium (vapor pressure).

Figure 3:
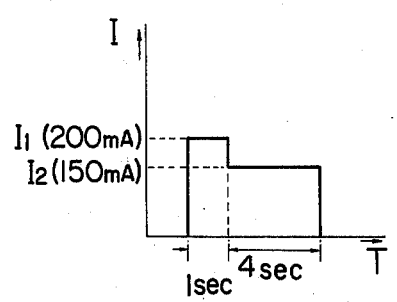
FIG. 3 is a waveform diagram of currents to be supplied to the superconductor wire.

In the first place, the terminal voltage of the superconductor wire 2 was measured with a current value of 200 mA lying within the plateau region. Then, while the liquid helium was in the reduced-pressure state, the rate of evaporation became high and the effect of cooling by gaseous helium became great, so that the terminal voltage of the superconductor wire 2 became somewhat lower. Under the superfluid state or the pressurized state (in which the flow of the gasified helium lessened to weaken the cooling effect), the indication of the liquid level appeared to be somewhat higher on account of the temperature-dependency (due to self-heating). On the other hand, on the basis of this invention, the current $I_1$ = 200 mA was supplied for 1 second and thereafter the pulse current $I_2$ = 150 mA was impressed stepwise as illustrated in FIG. 3. Then, favorable results free of dispersion could be obtained for the superfluid helium and the reduced-pressure state.

As set forth above, this invention disposes, in the liquid level indicator of the specified type, the current supply portion which, at first, increases the current to be fed to the superconductor wire up to the plateau region in the current — voltage hysteresis curve of the superconductor wire, and thereafter, decreases it down to the return-path rectilinear region in the curve departing from the plateau region, the liquid level being gauged on the basis of the measured value of the terminal voltage of the superconductor wire as obtained by the use of the decreased current. Therefore, the dispersion of the measured values in the superfluid state or under the reduced pressure as previously referred to does not occur, and the liquid levels of helium at 4.2 ° K to superfluid helium can be gauged with the identical instrument providing the currents $I_1$ and $I_2$. In addition, since the measurement is possible with the decreased or smaller current, heat loss can be reduced.

We claim:

1. A liquid level indicator for an extremely low temperature-liquefied gas, comprising:
   a superconductor wire which has terminals and which is immersed in the extremely low temperature-liquefied gas,
   a voltmeter which is connected to the terminals of said superconductor wire so as to measure a voltage across said terminals, and
   a current supply portion which is connected to said superconductor wire and which, at first, increases a current to be fed to said superconductor wire up to a plateau region in a current — voltage hysteresis curve of said superconductor wire, and thereafter, decreases it down to a return-path rectilinear region in the curve departing from the plateau region, a liquid level of said liquefied gas being gauged on the basis of the measured value of the terminal voltage of said superconductor wire as obtained by the use of the decreased current.

2. The liquid level indicator according to claim 1, which is used for liquid helium.

3. The liquid level indicator according to claim 1, wherein said superconductor wire is an Nb-Ti wire.

4. The liquid level indicator according to claim 2, wherein said current supply portion feeds, at first, a current of 200 mA for 1 second, and thereafter, a current of 150 mA for 4 seconds.

* * * * *